Patented Aug. 11, 1953

2,648,644

UNITED STATES PATENT OFFICE 2,648,644

SOFTENING AGENT FOR RUBBER, AND RESULTANT RUBBER COMPOSITION

Frank M. McMillan, Berkeley, and De Loss E. Winkler, Orinda, Calif., assignors to Shell Development Company, San Francisco, Calif., a corporation of Delaware No Drawing. Application April 26, 1950, Serial No. 158,322

6 Claims. (Cl. 260—28.5)

This invention provides novel softening ingredients for use in the working of rubbers, and it is also directed to the resulting rubber compositions.

As employed herein, the term "rubber" embraces both natural rubber, in all its various raw and reclaimed forms, as well as the various synthetic rubbers, i. e., rubbery polymers, of the type which may be vulcanized with sulfur. Representative synthetic rubbery polymers of this variety are the homopolymerization products of butadiene and those of its homologues and derivatives, as, for example, methyl butadiene, dimethyl butadiene, pentadiene, and chloroprene (neoprene synthetic rubber), as well as copolymers such as those formed from butadiene, or its homologues or derivatives, with other unsaturated organic compounds. Among the latter are acetylenes, as vinyl acetylene; olefins, as isobutylene, which copolymerizes with butadiene to form butyl synthetic rubber, vinyls, as vinyl chloride, acrylic acid, acrylonitrile (which polymerizes with butadiene to form the synthetic rubber Buna N), methacrylic acid and styrene, the latter compound polymerizing with butadiene to form the synthetic rubber Buna S as well as vinyl esters and various unsaturated aldehydes, ketones and ethers, e. g., acrolein, methyl isopropenyl ketone, and vinyl ethyl ether. The foregoing rubber materials, including both natural rubber as well as the various synthetic rubbers, may be defined as "rubbery polymers of at least one compound selected from the group consisting of the conjugated diolefins and chloroprene."

Rubber compositions of a type suitable to be vulcanized with sulfur are prepared by blending with the rubber stock a number of other ingredients. However, the physical condition of said stocks is usually such that this compounding may be effected only as the rubber is masticated on a mill or in a mixer until it becomes plastic. This mastication process is normally productive of large amounts of heat, with the result that there is danger of prematurely vulcanizing the composition. However, the amounts of heat generated in this fashion may be considerably reduced by adding to the rubber being worked one or more oils, fats, waxes, tars, or the like which have an affinity for rubber and act to swell and soften the same, thereby accelerating the mechanical action of the mixer.

The effectiveness of the foregoing softening agents varies greatly from one material to another, some acting principally to reduce the amount of heat generated during the mixing process, while others impart tackiness to the mixture and thereby increase its homogeneity and overall workability. Still others have important scorch retarding properties and thereby reduce the tendency of the rubber stock to become vulcanized at the temperatures normally encountered during working on the mill without affecting the cure rate at the higher temperatures employed in the subsequent vulcanization steps. Some few softening agents possess more than one of these qualities in some measure, but only an extremely limited number of such compounds are sufficiently well rounded as to be regarded as all-purpose softeners. One such material is pine tar, a composition which finds particular utility in connection with various tire stocks as well as with rubber compositions used for other purposes, and it is an object of this invention to provide an economical material, largely of petroleum origin, whose attributes are equal to or even superior to those of pine tar and may be employed as a substitute therefor either in whole or in part.

It is our discovery that a composition made up of from about 1 to 25% of an aromatic carboxylic acid and at least 25% of an aromatic petroleum derivative composition, with the balance of the material, if any, being essentially comprised of a neutral petroleum oil, represents an excellent softener for use in both natural as well as synthetic rubbers. This composition not only has the ability to soften the mass and supply the desired condition of tackiness, but it also decreases the scorchiness of the rubber and permits the effective compounding thereof at normal operating temperatures. The resulting composition has a high Mooney scorch time coupled with a good elastic recovery, or nerve. In short, both the unvulcanized as well as vulcanized compositions prepared with the softener of this invention possess all the desirable attributes of those compounded with pine tar and in many cases are even superior to the latter.

The aromatic acid component of the softener composition of the present invention may be selected from a wide range of mono- or polycarboxylic acids of substituted or unsubstituted character, and, if desired, mixtures of one or more of said acids may be used. Thus, representative acids which may be used in the process of the invention are benzoic acid, o-, m-, and p-toluic acids, p-butylbenzoic acid, p-allylbenzoic acid, 2-methyl-4-isopropylbenzoic acid, 2,4-dimethylbenzoic acid, p-isopropylbenzoic acid, p-heptylbenzoic acid, p-nonylbenzoic acid, p-dodecylbenzoic acid, p-cyclohexylbenzoic acid, 2-methyl-4-allylbenzoic acid, p-methallylbenzoic acid, o-propylbenzoic acid, 2-naphthoic acid, 4-methylnaphthoic acid, 1-anthroic acid, naphthalic acid, phthalic acid, isophthalic acid, terephthalic acid, 4-methylphthalic acid, salicylic acid, 3-methylsalicylic acid, 3-ethyl-5-isopropyl salicylic acid, 3,5-diisopropylsalicylic acid, o-, m-, and p-chlorobenzoic acids; o-, m-, and p-nitrobenzoic acids, the chlorotoluic acids and the chlorosalicylic acids.

A preferred group of aromatic acids for use in the present invention comprises the mononuclear acids such as benzoic and phthalic acids which are either unsubstituted or substituted with one or more members selected from the group consisting of the hydroxyl and the lower alkyl radicals, i. e., those containing not more than about 7 carbon atoms. Representative acids falling within this preferred group are benzoic acid, p-toluic acid, p-tert-butylbenzoic acid, o-hexylbenzoic acid, m-ethylbenzoic acid, phthalic aicd, 4-methylphthalic acid, salicylic acid, and 3,5-diisopropylsalicylic acid.

The aromatic petroleum derivative fraction of the composition is made up of high molecular weight, aromatic hydrocarbons which may or may not contain sulfur and which are obtained as residues and extracts in processes involving removal of light ends and the various lubricating oil fractions from crude oils. Included among the said products are the various residual asphalts, either per se or in the form of liquid emulsions or solutions with a neutral petroleum oil, as well as the liquid extracts obtained by treating the oil with agents of the type of sulfur dioxide, furfural, phenol, propane, cresol or the like. These petroleum derivatives vary in viscosity from about 10 cs. at 210° F. up to more or less solid asphaltic compositions softening at about 100 to 200° F., and in specific gravity ($d\ 20/4$) from about 0.9 to 1.05. Their initial boiling point is at least 300° F. at 1 mm. Hg. As was the case with the aromatic acid fraction of the softener composition, these various petroleum derivatives may be employed either singly or in combination. Thus, excellent results have been obtained by the use in rubbers of a mixture made up of benzoic or toluic acids and an asphaltic type residue, and optionally with a so-called neutral, or volatile petroleum oil as well. Again, good results have also been obtained with benzoic or salicylic acid in combination with a solution of an asphaltic residue in a duosol, Edeleanu, or furfural extract. Likewise, it is also possible to omit the asphaltic component altogether and to obtain a good rubber softening agent by employing as the petroleum derivative one or more of the said duosol, Edeleanu or furfural extracts in combination with the aromatic acid. However, it is preferred not to omit the asphaltic residue altogether from the softening composition.

The aromatic acid and petroleum derivative components of the softener may be added to the rubber either separately or in the form of a previously prepared composition. In either case, however, it is important that the overall aromatic acid content of the softener not exceed about 25%, for with larger amounts there ensues an undesirable increase in the modulus of the final vulcanizate, i. e., the vulcanized articles become stiffer than would otherwise be the case and a greater force is required to stretch them in any predetermined amount. On the other hand, the acid content of the softener should not fall below about 1% for there then ensues a rapid increase in the scorchability of the stock together with an impairment of its tackiness and overall workability. A preferred proportional range for the softener ingredients is from 3 to 15% of the aromatic acid constituent, or constituents, and from 85 to 95% of the petroleum derivative together with any neutral petroleum oil which may be present. The term "neutral petroleum oil" here refers to any volatile or distillable petroleum fraction, the latter normally being predominantly of aliphatic character. Such neutral oils, which frequently act as a base or solvent for the other components of the softener composition, may be present in an amount up to about 50% of the overall weight of the softener without impairing the action of the softener.

In working up the rubber with the softener, the components of the latter are added to the rubber in the form of previously prepared liquids, semi-liquids, or solids, followed by thorough mixing to attain a mass of the desired plasticity and tackiness, after which the other compounding ingredients are normally worked into the product. The resulting mixture is then subjected to the desired shaping and vulcanizing operations. The amount of softener to be employed is susceptible to considerable variation and depends both on the nature of this additive as well as on that of the rubber and the other compounding ingredients used. However, good results are obtained by using from about 2 to 20 parts of the softening composition for each 100 parts of rubber, and preferably there are employed from 5 to 10 parts of the softener for each 100 parts of the rubber. As was pointed out above, the term "rubber" is here employed to include any organic rubbery polymer capable of being vulcanized with sulfur, and it embraces not only the various natural rubbers, but also the synthetic rubbers prepared in whole or in part from conjugated diolefins or chloroprene. Combinations of both natural and synthetic rubbers may also be used.

The new vulcanizable compositions of this invention comprise homologous mixtures of one or more of the above-identified softeners with one or more rubbers, or rubbery polymers, of the type vulcanizable with sulfur, and with or without other rubber compounding ingredients as noted below. Such mixtures may be produced by any known method, including blending on a roll mill or Banbury mixer. The raw rubbers are sometimes supplied in the form of an emulsion in water or other liquid, as in the case of latex natural rubber. The softening compositions of this invention may be added to such emulsions either per se or in the form of other emulsions, after which the mass is precipitated and worked up in a manner known in the art.

In addition to the softener, the vulcanizable composition contains other additives, of which one is necessarily the vulcanizing agent. Suitable agents of this character are sulfur, sulfur chloride, sulfur thiocyanate, thiuram polysulfides and other organic or inorganic polysulfides, organic and inorganic peroxides, halogen-containing compounds and nitrogen-containing compounds such as the nitrobenzenes.

Vulcanization accelerators and accelerator-activators may also be present, particularly when sulfur-containing compounds are ingredients of the compositions. Illustrative examples of accelerators are tetra-methyl thiuram disulfide, zinc dibutyl dithiocarbamate, tetramethyl thiuram monosulfide, dipentamethylene-thiuram tetrasulfide, mercapto benzo thiazole, hexamethyene-tetramine, aldehyde-ammonia, diphenylguanidine, diphenylthiourea, benzo thiazyl disulfide, piperidinium pentamethylene-dithiocarbamate, ditolylguanidine and lead dimethyl-dithiocarbamate. The metal oxides such as zinc oxide and lead oxides are frequently added as accelerator-activators.

While the softening agents of the present invention exhibit a plasticizing as well as a softening and tackifying action, in some cases it may also be desirable to use additional plasticizers of which dibutyl phthalate, dioctyl phthalate, tricresyl phosphate, triacetin, tetralin, cumar resins, soft factice, wool gloss, stearic acid, and lauric acid are examples. Pine tar itself may comprise up to 50% of the softening agent composition.

Having compounded the rubber by mixing therewith the above-described materials, the mix is vulcanized by treatment at elevated temperatures, preferably above 100° C., for periods varying from several minutes to one or more hours. Preferred vulcanizing treatments are those conducted at temperatures of from 125 to 175° C. for from 15 to 45 minutes.

Compositions produced in accordance with the invention are capable of use for substantially all of the purposes for which other rubber-like compositions are employed. Examples which come readily to mind are automobile tires and tubes, floor tilings, balloon coverings, umbrellas, raincoats, table covers, shower curtains, garment bags, electrical insulation friction tape, hose for the handling of aqueous substances and of petroleum products and paints, lining and exterior coating in self-sealing gasoline tanks, gaskets, belts, shoe soles and heels, aprons, gloves, sporting goods, such as rubber balls, bathing suits and caps, and drug sundries.

The following example illustrates the present invention in various of its embodiments.

*Example*

A natural rubber tire tread stock was formed on a two-roll rubber mill by blending 10 parts of a softener with a rubber composition made up of 100 parts smoker sheet admixed with 50 parts of carbon black, and thereafter milling into the resulting plastic mass 1 part mercaptobenzothiozole, 1 part phenyl beta-naphthylamine, 5 parts zinc oxide, 4 parts stearic acid and 3 parts sulfur. As indicated in Table I to follow, various softening agents were employed in working up this stock. The "Duosol extract" mentioned in the table refers to the aromatic extract obtained by treating petroleum distillate with phenol and propane and then distilling off the phenol from the extract so obtained, this extract having a specific gravity (D 20/4) of 1.02, a viscosity (210° F., cs.) of 32, a flash point of 475° F. and an initial boiling point (1 mm. Hg) of 444° F. The asphalt-neutral oil composition employed alone as the softener in test No. 11 in the table, and with benzoic acid in test No. 12, refers to a 70% solution of an asphalt petroleum residue in a neutral petroleum oil solvent, which solution has a specific gravity (D 20/4) of 0.98, a viscosity (100° F., cs.) of 3540, a flash point of 450° F., and an initial boiling point (1 mm. Hg) of 302° F.

| Softener Composition | Mooney Scorch Time of Unvulcanized Stock (Minutes at 121° C.) | Tack of Unvulcanized Stock |
|---|---|---|
| 1. 100% Pine Tar | 41 | Fair. |
| 2. 100% Duosol extract | 39½ | Poor. |
| 3. 90% Duosol extract+10% benzoic acid | 45½ | Good. |
| 4. 90% Duosol extract+10% p-toluic acid | 41½ | Do. |
| 5. 90% Duosol extract+10% m-toluic acid | 43 | Do. |
| 6. 90% Duosol extract+10% p-tert-butyl benzoic acid | 40½ | Do. |
| 7. 90% Duosol extract+10% p-nonylbenzoic acid | 40½ | Poor. |
| 8. 97% Duosol extract+3% benzoic acid | 40 | Good. |
| 9. 90% Duosol extract+10% phthalic acid | 51 | Do. |
| 10. 90% Duosol extract+10% salicylic acid | 42 | Do. |
| 11. 100% asphalt solution (70% asphalt, 30% neutral oil) | 39½ | Poor. |
| 12. 90% asphalt solution (70% asphalt, 30% neutral oil)+10% benzoic acid | 42½ | Good. |

The various parts and percentages expressed herein are on a weight basis unless otherwise indicated.

The invention claimed is:

1. A rubber softening composition comprising from about 1 to 25% of an aromatic carboxylic acid together with at least 25% of an aromatic petroleum fraction and from 0 to 50% of a neutral petroleum oil, said aromatic petroleum fraction having a viscosity of at least 10 cs. at 210° F., softening below 200° F., and having a specific gravity (d 20/4) of from 0.9 to 1.05.

2. The softening composition of claim 1 wherein the aromatic acid is benzoic acid and the petroleum fraction is an asphaltic residue.

3. The rubber softening composition comprising from 3 to 15% of an aromatic carboxylic acid selected from the group consisting of unsubstituted mono-nuclear aromatic carboxylic acids and mono-nuclear aromatic carboxylic acids substituted in their nuclear position by at least one member selected from the group consisting of the hydroxyl and the lower alkyl groups, together with at least 25% of an aromatic petroleum fraction and from 0 to 50% of a neutral petroleum oil, said aromatic petroleum fraction having a viscosity of at least 10 cs. at 210° F., softening below 200° F., and having a specific gravity (d 20/4) of from 0.9 to 1.05.

4. The composition of claim 3 wherein the petroleum fraction is an extract obtained by treating petroleum with propane and phenol.

5. The composition of claim 3 wherein the petroleum fraction is an asphaltic residue.

6. A softened rubber composition made up in the ratio of 100 parts rubber to 2 to 20 parts of a softener composition comprising from about 1 to 25% of an aromatic carboxylic acid together with at least 25% of an aromatic petroleum fraction and from 0 to 50% of a neutral petroleum oil, said aromatic petroleum fraction having a viscosity of at least 10 cs. at 210° F., softening below 200° F., and having a specific gravity ($d\ 20/4$) of from 0.9 to 1.05.

FRANK M. McMILLAN.
DE LOSS E. WINKLER.

References Cited in the file of this patent

UNITED STATES PATENTS

| Number | Name | Date |
|---|---|---|
| 1,815,778 | Kinney | July 21, 1931 |
| 1,826,392 | Dunham | Oct. 6, 1931 |
| 1,847,600 | Dunham | Mar. 1, 1932 |
| 2,002,800 | Schrauth | May 28, 1935 |
| 2,034,889 | Williams | Mar. 24, 1936 |
| 2,334,582 | Read | Nov. 16, 1943 |
| 2,449,929 | Corkery | Sept. 21, 1948 |
| 2,465,960 | Berge | Mar. 29, 1949 |
| 2,470,141 | Caves | May 17, 1949 |

FOREIGN PATENTS

| Number | Country | Date |
|---|---|---|
| 572,634 | Great Britain | Oct. 17, 1945 |